US012115123B2

(12) United States Patent
Ugoletti et al.

(10) Patent No.: US 12,115,123 B2
(45) Date of Patent: Oct. 15, 2024

(54) MEDICAL WALKER DEVICES AND METHODS OF USING THE SAME

(71) Applicants: Donald H. Ugoletti, Indianapolis, IN (US); Tanya M. Ugoletti, Indianapolis, IN (US)

(72) Inventors: Donald H. Ugoletti, Indianapolis, IN (US); Tanya M. Ugoletti, Indianapolis, IN (US)

( * ) Notice: Subject to any disclaimer, the term of this patent is extended or adjusted under 35 U.S.C. 154(b) by 210 days.

(21) Appl. No.: 17/845,244

(22) Filed: Jun. 21, 2022

(65) Prior Publication Data

US 2022/0401288 A1 Dec. 22, 2022

Related U.S. Application Data

(60) Provisional application No. 63/213,603, filed on Jun. 22, 2021.

(51) Int. Cl.
*A61H 3/04* (2006.01)

(52) U.S. Cl.
CPC ....... *A61H 3/04* (2013.01); *A61H 2201/1638* (2013.01)

(58) Field of Classification Search
CPC ........................................................ A61H 3/04
See application file for complete search history.

(56) References Cited

U.S. PATENT DOCUMENTS

| | | | | |
|---|---|---|---|---|
| 4,065,145 A * | 12/1977 | Chambers | A61G 5/1051 | 482/68 |
| 4,962,781 A * | 10/1990 | Kanbar | A61H 3/04 | 135/65 |
| 5,058,912 A * | 10/1991 | Harroun | A61H 3/04 | 482/68 |
| 5,351,700 A * | 10/1994 | Jones, III | A61H 3/04 | 280/87.021 |
| 5,443,304 A * | 8/1995 | Fochs | A61H 3/04 | D12/128 |
| 5,647,602 A * | 7/1997 | Nevin | A61H 3/04 | 482/68 |
| 7,252,105 B2 * | 8/2007 | Otis | A45B 1/04 | 135/85 |
| 9,936,777 B1 * | 4/2018 | Parkinson | A45B 9/00 | |
| 11,090,215 B2 * | 8/2021 | Bailey | A61H 3/04 | |

* cited by examiner

*Primary Examiner* — Noah Chandler Hawk
(74) *Attorney, Agent, or Firm* — Reichel Stohry Dean LLP; Mark C. Reichel; Natalie J. Dean

(57) ABSTRACT

Medical walker devices and methods of using the same. The present disclosure includes disclosure of a walker, including an upper bar defining a first upper bar end and a second upper bar end, a grip element defined within the upper bar or formed as part thereof, a relative rear end including a rear base portion and a rear base bar, a rear vertical bar coupled to the rear base bar and to the upper bar, a first side wheel structure having a first side wheel bar and one or more first side wheels or castors, and a second side wheel structure having a second side wheel bar and one or more second side wheels or castors; and a front wheel structure including one or more front wheels or castors.

17 Claims, 7 Drawing Sheets

MEDICAL WALKER DEVICES AND METHODS OF USING THE SAME

PRIORITY

The present application is related to, and claims the priority benefit of, U.S. Provisional Patent Application Ser. No. 63/213,603, filed Jun. 22, 2021, the contents of which are incorporated herein directly and indirectly by reference in their entirety.

BACKGROUND

Traditional walking assist devices, with the exception of a cane, require two hands to operate or maneuver. For people with a condition affecting his or her muscles, joints, and/or nervous system, a walking assist device is critical for successful ambulation. For those people with a more severe condition, such as those whereby a cane does not provide enough stability, a more complex walking assist device, such as a traditional "walker" with wheels, cannot be used if those people do not have enough functionality of both hands.

In view of the same, a walker that only requires one hand to operate and that is suitable for people with conditions affecting their muscles, joints, and/or nervous system, would be well received in the medical industry.

BRIEF SUMMARY

The present disclosure includes disclosure of a walker, as shown and/or described herein.

The present disclosure includes disclosure of a method of using a walker, as shown and/or described herein.

The present disclosure includes disclosure of a walker, comprising an upper bar defining first upper bar end and a second upper bar end, and (or optionally) a grip element defined within the upper bar or formed as part thereof, and (or optionally) a relative rear end comprising a rear base portion and a rear base bar, and (or optionally) a rear vertical bar coupled to the rear base bar and to the upper bar, and (or optionally) a first side wheel structure having a first side wheel bar and one or more wheels or castors, and (or optionally) a second side wheel structure having a second side wheel bar and one or more wheels or castors, and (or optionally) one or more extensions used to connect two adjacent elements together, and (or optionally) a lower bar coupled to the rear vertical bar and to a front vertical bar, the lower bar defining a first lower bar end and an opposite second lower bar end, and (or optionally) a front wheel structure comprising a first front wheel bar, a second front wheel bar, and one or more wheels or castors.

The present disclosure includes disclosure of a walker, comprising an upper bar defining a first upper bar end and a second upper bar end, a grip element defined within the upper bar or formed as part thereof, a relative rear end comprising a rear base portion and a rear base bar, a rear vertical bar coupled to the rear base bar and to the upper bar, a first side wheel structure having a first side wheel bar and one or more first side wheels or castors, and a second side wheel structure having a second side wheel bar and one or more second side wheels or castors; and a front wheel structure comprising one or more front wheels or castors.

The present disclosure includes disclosure of a walker, further comprising a front vertical bar coupled to the upper bar at the second upper bar end.

The present disclosure includes disclosure of a walker, further comprising a lower bar coupled to the rear vertical bar and the front vertical bar.

The present disclosure includes disclosure of a walker, wherein the front wheel structure is coupled to the front vertical bar.

The present disclosure includes disclosure of a walker, wherein the front wheel structure comprises a first front wheel bar having a first front wheel or castor of the front wheels or castors coupled thereto.

The present disclosure includes disclosure of a walker, wherein the front wheel structure comprises a second front wheel bar having a second front wheel or castor of the front wheels or castors coupled thereto.

The present disclosure includes disclosure of a walker, wherein the first front wheel bar extends proximally in a direction defined by a longitudinal axis of the upper bar, and wherein the second front wheel bar extends laterally in a first lateral direction defined perpendicular to the longitudinal axis of the upper bar.

The present disclosure includes disclosure of a walker, wherein the one or more first side wheels or castors is/are positioned distal to the rear base bar and wherein the one or more second side wheels or castors is/are positioned proximal to the rear base bar.

The present disclosure includes disclosure of a walker, wherein the one or more second side wheels or castors is positioned laterally to the upper bar in the first lateral direction.

The present disclosure includes disclosure of a walker, wherein the rear vertical bar is coupled to the rear base bar using a first extension, and wherein the rear vertical bar is also coupled to the upper bar using a second extension.

The present disclosure includes disclosure of a walker, wherein the lower bar is coupled to the rear vertical bar using a first extension, and wherein the lower bar is also coupled to the front vertical bar using a second extension.

The present disclosure includes disclosure of a walker, wherein the front wheel structure is coupled to the front vertical bar using an extension.

The present disclosure includes disclosure of a walker, comprising polyvinyl chloride (PVC) components.

The present disclosure includes disclosure of a method of using a walker, comprising standing adjacent an exemplary walker of the present disclosure on a same side as the first side wheel structure proximal to the first side wheel structure and gripping the grip element, and walking in a forward direction while gripping the grip element, using the walker to maintain balance while walking.

The present disclosure includes disclosure of a walker, comprising an upper bar defining a first upper bar end and a second upper bar end, a grip element defined within the upper bar or formed as part thereof, a relative rear end comprising a rear base portion and a rear base bar, a rear vertical bar coupled to the rear base bar and to the upper bar, a first side wheel structure having a first side wheel bar and one or more first side wheels or castors, a second side wheel structure having a second side wheel bar and one or more second side wheels or castors, a front vertical bar coupled to the upper bar at the second upper bar end, a front wheel structure comprising one or more front wheels or castors, and a lower bar coupled to the rear vertical bar and the front vertical bar, wherein the front wheel structure is coupled to the front vertical bar, wherein the front wheel structure comprises a first front wheel bar having a first front wheel or castor of the front wheels or castors coupled thereto, wherein the front wheel structure comprises a second front wheel bar having a second front wheel or castor of the front wheels or castors coupled thereto, and wherein the first front wheel bar extends proximally in a direction defined by a longitudinal axis of the upper bar, and wherein the second front wheel bar extends laterally in a first lateral direction defined perpendicular to the longitudinal axis of the upper bar.

The present disclosure includes disclosure of a walker, wherein the one or more first side wheels or castors is/are positioned distal to the rear base bar and wherein the one or more second side wheels or castors is/are positioned proximal to the rear base bar.

The present disclosure includes disclosure of a walker, wherein the one or more first side wheels or castors is/are positioned distal to the rear base bar and wherein the one or more second side wheels or castors is/are positioned proximal to the rear base bar.

The present disclosure includes disclosure of a walker, wherein the one or more second side wheels or castors is positioned laterally to the upper bar in the first lateral direction.

The present disclosure includes disclosure of a walker, wherein the rear vertical bar is coupled to the rear base bar using a first extension, wherein the rear vertical bar is also coupled to the upper bar using a second extension, wherein the lower bar is coupled to the rear vertical bar using a third extension, wherein the lower bar is also coupled to the front vertical bar using a fourth extension, and wherein the front wheel structure is coupled to the front vertical bar using a fifth extension.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
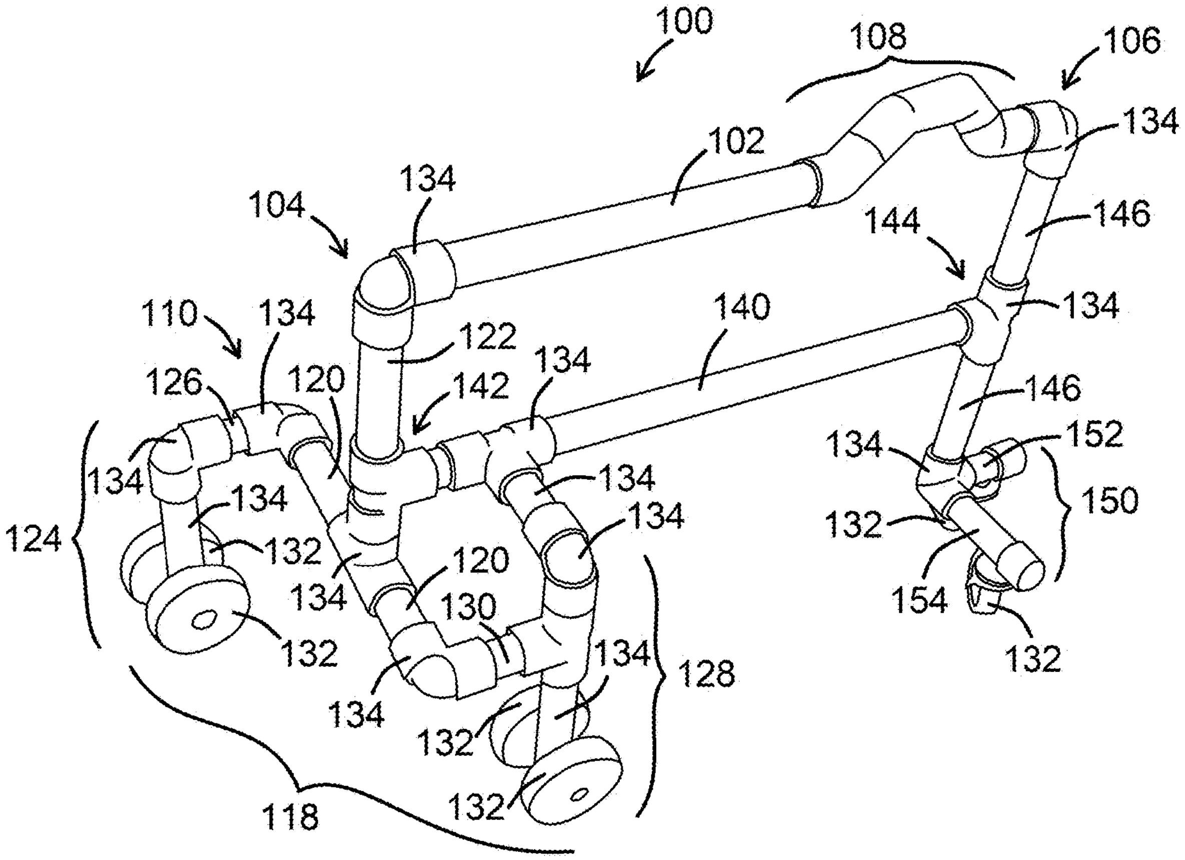
FIG. 1 shows a right side perspective view of a walker as a line drawing, according to an exemplary embodiment of the present disclosure.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

An exemplary walker of the present disclosure is shown in FIG. 1. As shown therein, walker 100 includes a number of support structures and wheels to help facilitate walking movement. Walker 100, in various embodiments, comprises an upper bar 102 extending between a first upper bar end 104 and a second upper bar end 106. Upper bar 102 is configured to be gripped by a user of walker 102 with using only one hand. Upper bar 102 can be horizontal or substantially horizontal (defining a horizontal or substantially horizontal axis). A grip element 108, such as shown in FIG. 1, can form part of upper bar 102 and be configured as the element that is ultimately gripped by the user to provide for a comfortable use of walker 100.

Walkers 100 of the present disclosure can be configured to be gripped using the user's right hand or the user's left hand. FIG. 1 shows a walker embodiment that is designed to be gripped using the user's right hand, as described in further detail below.

In right-hand grip embodiments, such as shown in FIG. 1, a relative rear end 110 of said walker 100 is configured such that the relative left side does not have any substantive elements distal to the first upper bar end 104. Exemplary walkers 100 of the present disclosure have a rear base portion 118 having a rear base bar 120 that is perpendicular or relatively perpendicular to upper bar 102. Rear base bar 120 is coupled to, or forms part of, upper bar 102 by way of a rear vertical bar 122 extending downward from upper bar 120. Rear base bar 120, as shown in FIG. 1, may then have a first side wheel structure 124 positioned distal to rear base bar 120, and can be connected to, or form part of, rear base bar 120 by way of a first side wheel bar 126 that, in various embodiments, could be perpendicular or substantially perpendicular to rear base bar 120 and/or be parallel with, or substantially parallel with, upper bar 102.

A relative right side of walker 100 can comprise a second side wheel structure 128 positioned proximal to rear base bar 120, and can be connected to, or form part of, rear base bar 120 by way of a second side wheel bar 130 that, in various embodiments, could be perpendicular or substantially perpendicular to rear base bar 120 and/or be parallel with, or substantially parallel with, upper bar 102.

First side wheel structure 124 and second side wheel structure 128, as described herein, can each comprise one or more wheels or castors 132, and can further comprise one or more extensions 134 positioned between wheels or castors 132 and first side wheel bar 126 or second side wheel bar 130, as applicable.

To provide additional structural rigidity, exemplary walkers 100 of the present disclosure can comprise a lower bar 140 positioned relatively below and parallel to upper bar 102. Lower bar 140, in a fashion similar to that of upper bar 102, can extend from a first lower bar end 142 to a second lower bar end 144. Upper bar 102 and lower bar 140 are therefore coupled to rear vertical bar 122 and a front vertical bar 146, such as shown in FIG. 1, providing structural rigidity to walker 100.

A front wheel structure 150, such as shown in FIG. 1, is coupled to front vertical bar 152 either directly or indirectly via one or more extensions 134. Front wheel structure 150 is configured so to be present on a relative right side of walker 100 so to not interfere with a user's walking stride and not be a tripping hazard. Front wheel structure 150 can have one or more wheels or castors 132 that are coupled to front vertical bar 146 either directly or indirectly via one or more extensions 134, or by way of a first front wheel bar 152 and/or a second front wheel bar 154, such as shown in FIG. 1. First front wheel bar 152 and second front wheel bar 154 can be relatively perpendicular to one another, such as one front wheel bar 152, 154 being parallel with upper bar 102 and/or lower bar 140, and another front wheel bar 152, 154 being perpendicular to upper bar 102 and/or lower bar 140.

A walker 100, such as shown in FIG. 1, could be used by the user standing to the left of the walker 100 and gripping walker 100 with his or her right hand. The user can then walk forward, with the supportive aid of walker 100, using only one hand, and without concern of his or her feet hitting or otherwise getting tangled with elements at the relative front and back of said walker.

Figure 2:
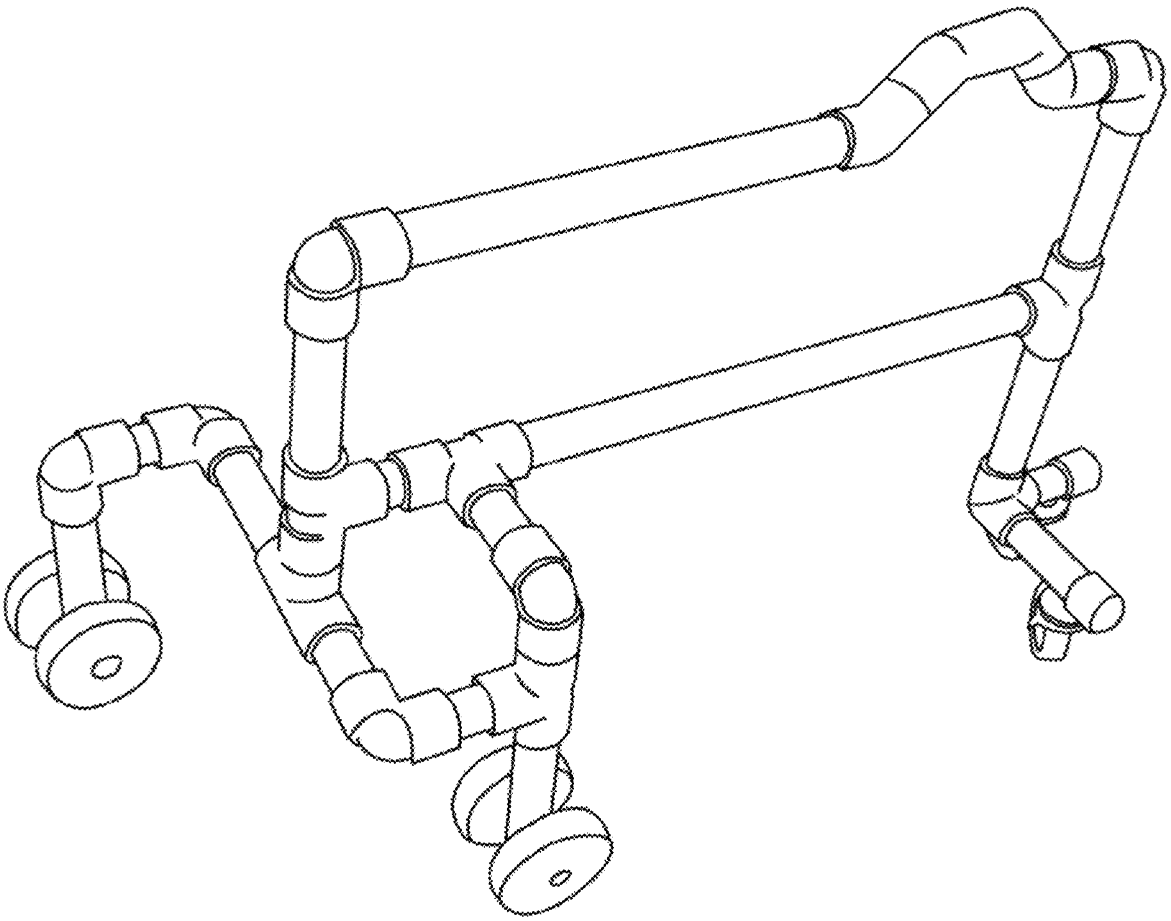
FIG. 2 shows a photograph of a right side perspective view of a walker, according to an exemplary embodiment of the present disclosure.
Figure 3:
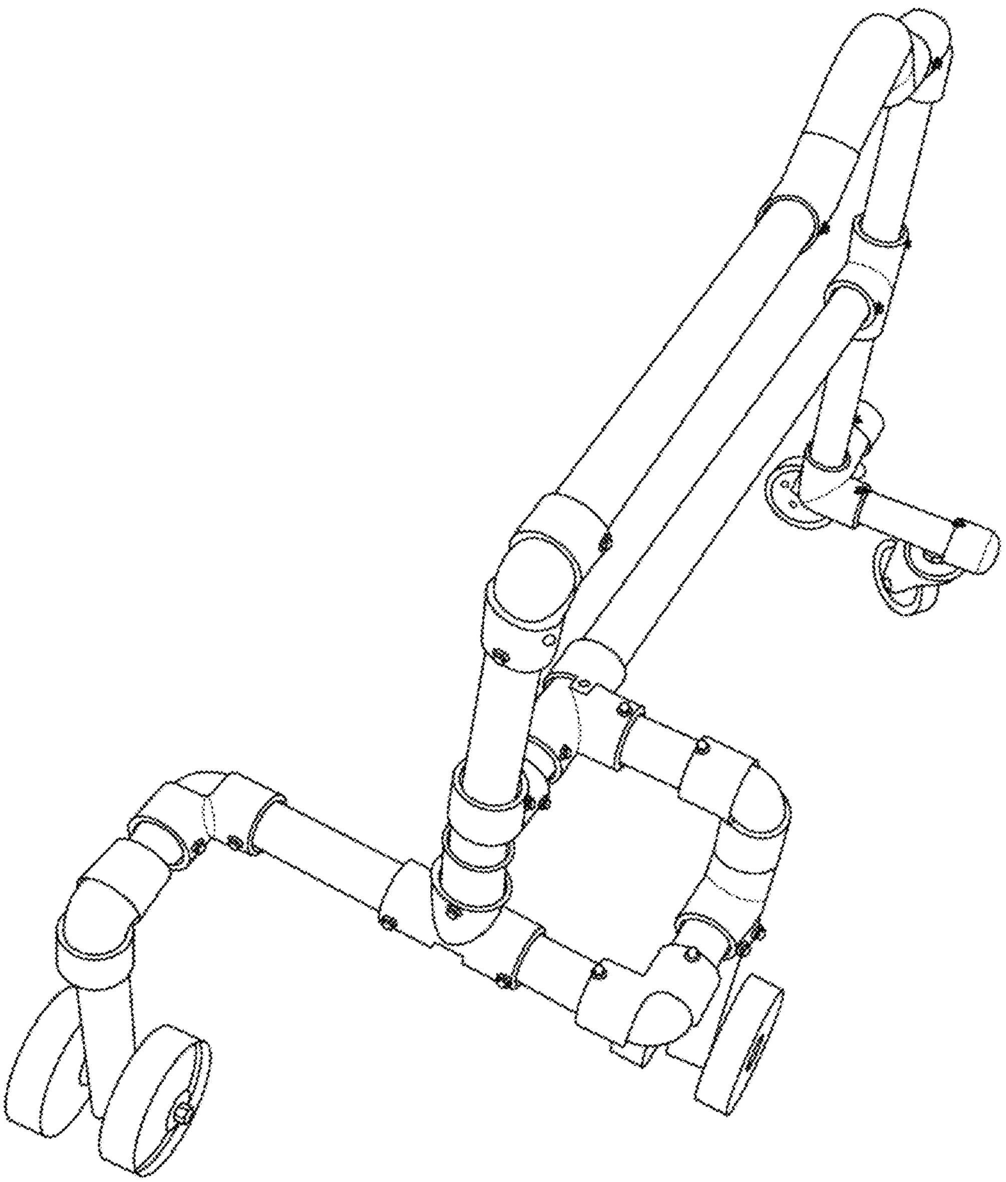
FIG. 3 shows a photograph of a back right side perspective view of a walker, according to an exemplary embodiment of the present disclosure.
Figure 4:
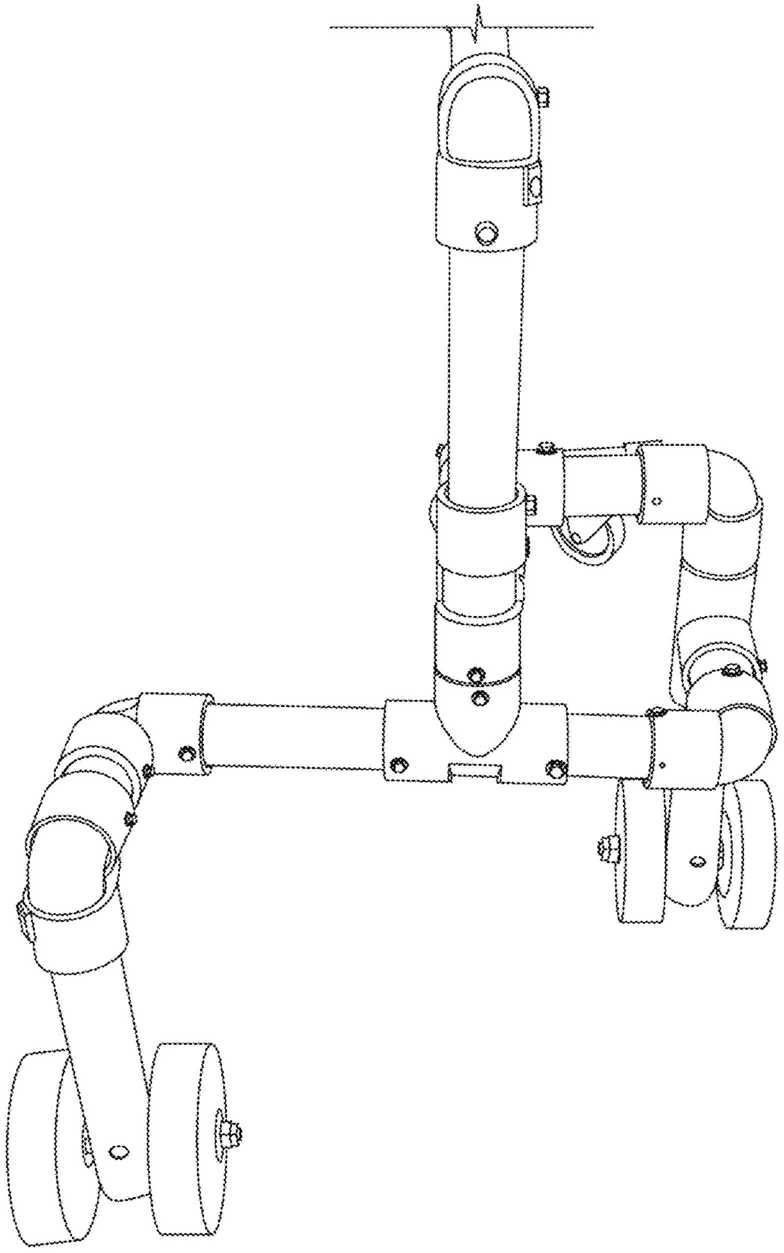
FIG. 4 shows a photograph of a rear perspective view of a walker, according to an exemplary embodiment of the present disclosure.
Figure 5:
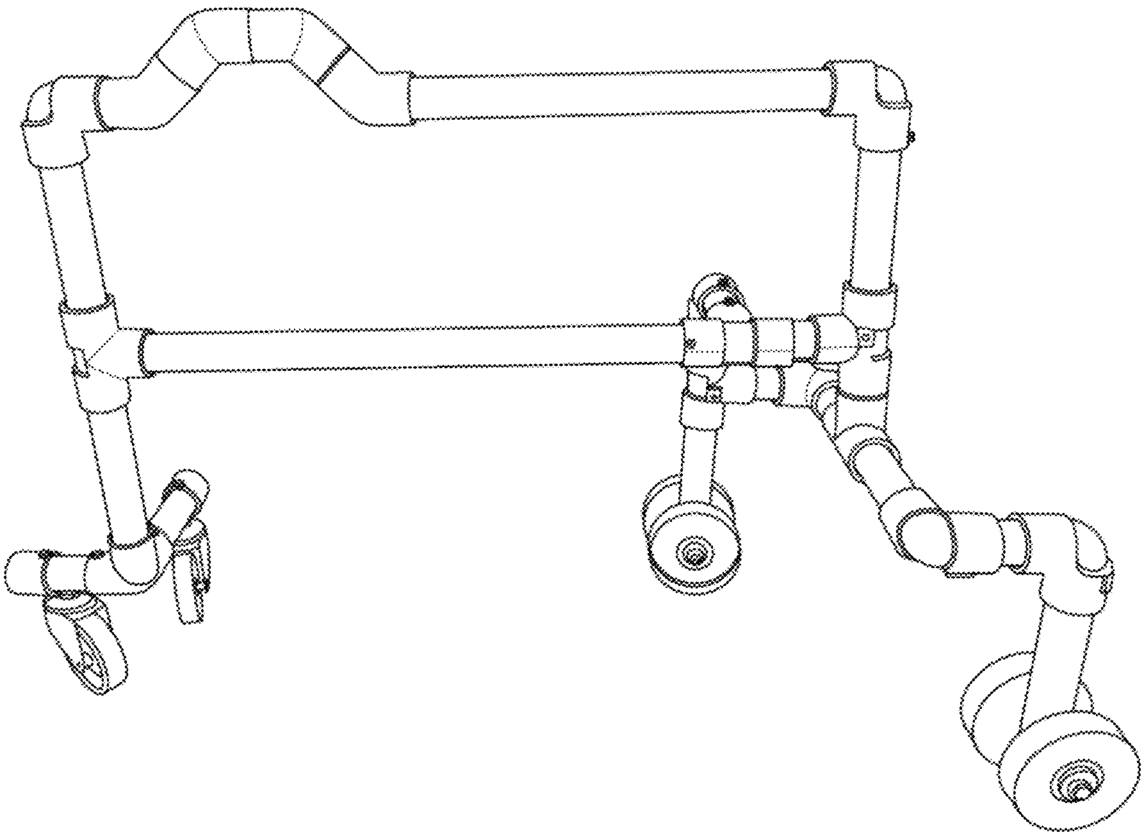
FIG. 5 shows a photograph of a left side perspective view of a walker, according to an exemplary embodiment of the present disclosure.
Figure 6:
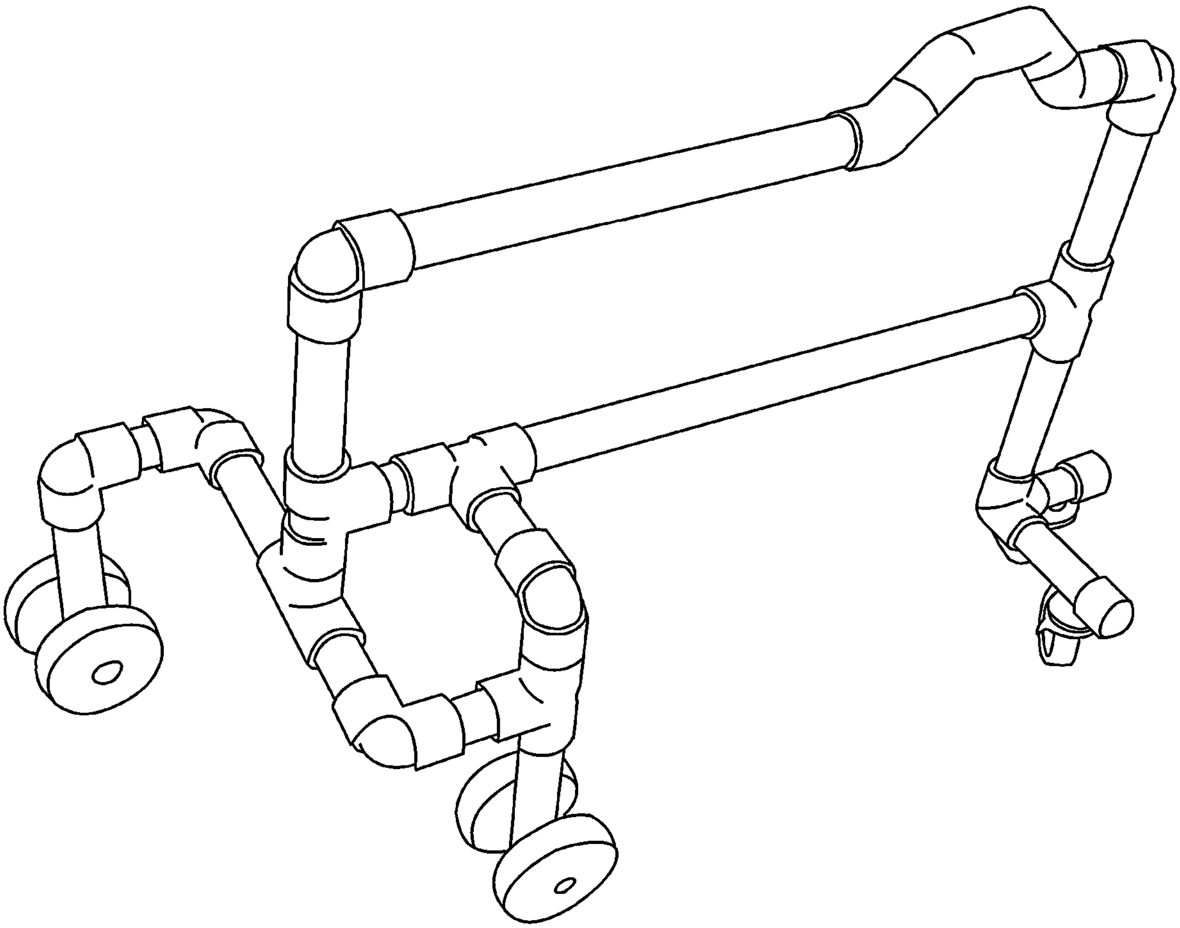
FIG. 6 shows the line drawing of FIG. 1 without reference numbering and corresponding reference lines.
Figure 7:
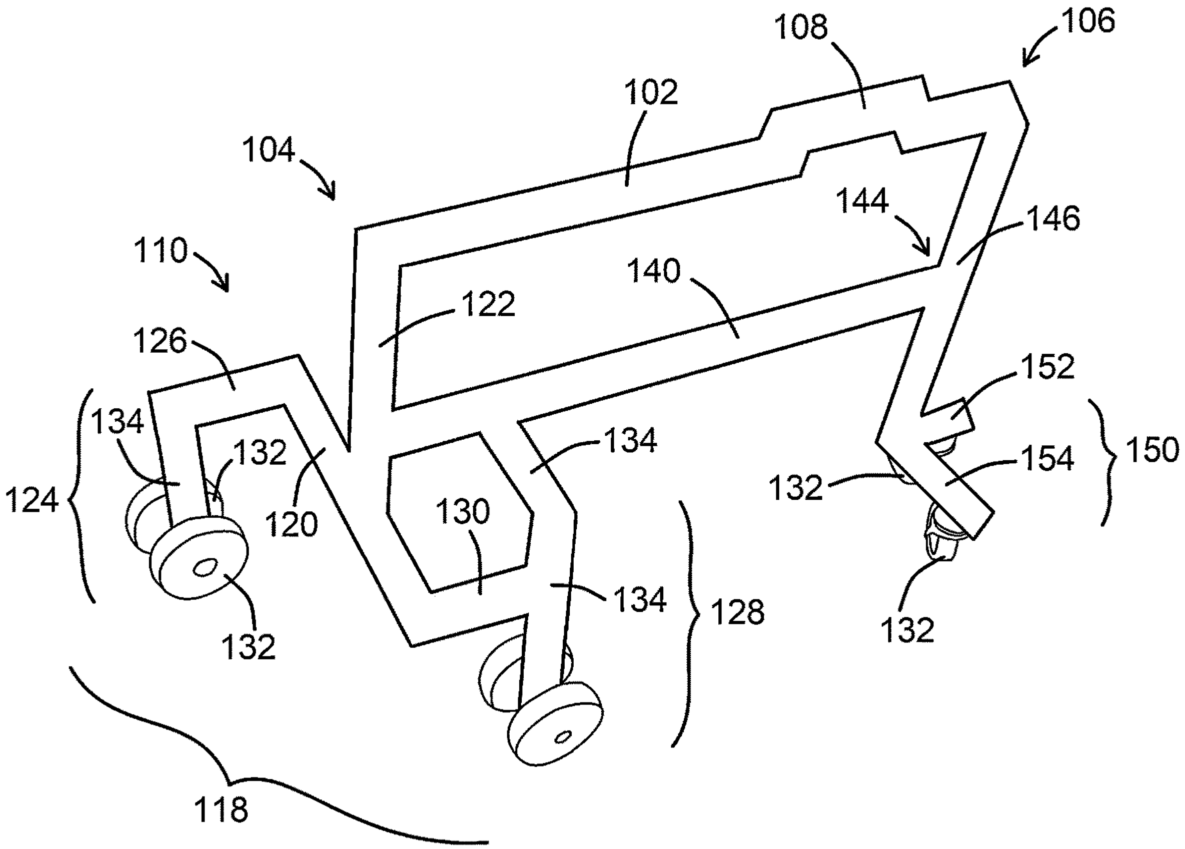
FIG. 7 shows a right side perspective view of a walker as a simplified line drawing, according to an exemplary embodiment of the present disclosure.

FIG. 2 shows a photograph of a right side perspective view of a walker, according to an exemplary embodiment of the present disclosure. FIG. 3 shows a photograph of a back right side perspective view of a walker, according to an exemplary embodiment of the present disclosure. FIG. 4 shows a photograph of a rear perspective view of a walker, according to an exemplary embodiment of the present disclosure. FIG. 5 shows a photograph of a left side perspective view of a walker, according to an exemplary embodiment of the present disclosure. FIG. 6 shows the line drawing of FIG. 1 without reference numbering and corresponding reference lines. FIG. 7 shows a right side perspective view of a walker as a simplified line drawing, according to an exemplary embodiment of the present disclosure.

It is noted that a walker 100 of the present disclosure could also be configured for use by a user using his or her left hand. In such an embodiment, all elements on the relative left side of walker 100 as shown in FIG. 1 would be present on the opposite right side in a mirror image orientation, and all elements on the relative right side of walker 100 as shown in FIG. 1 would be present on the opposite left side in a mirror image orientation. In such an embodiment, walker 100 could be used by the user standing to the right of the walker 100 and gripping walker 100 with his or her left hand. The user can then walk forward, with the supportive aid of walker 100, using only one hand, and without concern of his or her feet hitting or otherwise getting tangled with elements at the relative front and back of said walker.

Walkers 100 of the present disclosure can comprise any number of materials, including, but not limited to, plastic, metal, carbon fiber, wood, PVC, and the like. Furthermore, and in various embodiments, any number of extensions 134, whether straight, bent (like a 90° elbow), curved, etc., can be used to connect elements referenced herein that may otherwise be directly coupled to one another. For example, upper bar 102 can couple to front vertical bar 146 or rear vertical bar 122 directly, be formed as one unitary element, or be indirectly coupled to one another by way of one or more extensions 134. In addition, and for example, the front vertical bar 146, as shown in FIG. 1, can have an extension 134 therebetween, or it can not have an extension therebetween, such as shown in FIG. 7.

While various embodiments of walkers and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A walker, comprising:

an upper bar defining a first upper bar end and a second upper bar end;

a grip element defined within the upper bar or formed as part thereof;

a relative rear end comprising a rear base portion and a rear base bar;

a rear vertical bar coupled to the rear base bar and to the upper bar;

a first side wheel structure having a first side wheel bar and one or more first side wheels or castors; and a second side wheel structure having a second side wheel bar and one or more second side wheels or castors; and a front wheel structure comprising one or more front wheels or castors;

wherein the front wheel structure comprises a first front wheel bar having a first front wheel or castor of the front wheels or castors coupled thereto;

wherein the front wheel structure comprises a second front wheel bar having a second front wheel or castor of the front wheels or castors coupled thereto; and wherein the first front wheel bar extends proximally in a direction defined by a longitudinal axis of the upper bar, and wherein the second front wheel bar extends laterally in a first lateral direction defined perpendicular to the longitudinal axis of the upper bar.

2. The walker of claim 1, further comprising a front vertical bar coupled to the upper bar at the second upper bar end.

3. The walker of claim 2, further comprising:

a lower bar coupled to the rear vertical bar and the front vertical bar.

4. The walker of claim 3, wherein the front wheel structure is coupled to the front vertical bar.

5. The walker of claim 4, wherein the front wheel structure is coupled to the front vertical bar using an extension.

6. The walker of claim 3, wherein the lower bar is coupled to the rear vertical bar using a first extension, and wherein the lower bar is also coupled to the front vertical bar using a second extension.

7. The walker of claim 1, wherein the one or more first side wheels or castors is/are positioned distal to the rear base bar and wherein the one or more second side wheels or castors is/are positioned proximal to the rear base bar.

8. The walker of claim 1, wherein the one or more first side wheels or castors is/are positioned distal to the rear base bar and wherein the one or more second side wheels or castors is/are positioned proximal to the rear base bar.

9. The walker of claim 8, wherein the one or more second side wheels or castors is positioned laterally to the upper bar in the first lateral direction.

10. The walker of claim 1, wherein the rear vertical bar is coupled to the rear base bar using a first extension, and wherein the rear vertical bar is also coupled to the upper bar using a second extension.

11. The walker of claim 1, comprising polyvinyl chloride (PVC) components.

12. A method of using a walker, comprising:

standing adjacent the walker of claim 1 on a same side as the first side wheel structure proximal to the first side wheel structure and gripping the grip element; and walking in a forward direction while gripping the grip element, using the walker to maintain balance while walking.

13. A walker, comprising:

an upper bar defining a first upper bar end and a second upper bar end;

a grip element defined within the upper bar or formed as part thereof;

a relative rear end comprising a rear base portion and a rear base bar;

a rear vertical bar coupled to the rear base bar and to the upper bar;

a first side wheel structure having a first side wheel bar and one or more first side wheels or castors;

a second side wheel structure having a second side wheel bar and one or more second side wheels or castors;

a front vertical bar coupled to the upper bar at the second upper bar end;

a front wheel structure comprising one or more front wheels or castors; and a lower bar coupled to the rear vertical bar and the front vertical bar;

wherein the front wheel structure is coupled to the front vertical bar;

wherein the front wheel structure comprises a first front wheel bar having a first front wheel or castor of the front wheels or castors coupled thereto;

wherein the front wheel structure comprises a second front wheel bar having a second front wheel or castor of the front wheels or castors coupled thereto; and wherein the first front wheel bar extends proximally in a direction defined by a longitudinal axis of the upper bar, and wherein the second front wheel bar extends laterally in a first lateral direction defined perpendicular to the longitudinal axis of the upper bar.

14. The walker of claim 13, wherein the one or more first side wheels or castors is/are positioned distal to the rear base bar and wherein the one or more second side wheels or castors is/are positioned proximal to the rear base bar.

15. The walker of claim 14, wherein the one or more first side wheels or castors is/are positioned distal to the rear base bar and wherein the one or more second side wheels or castors is/are positioned proximal to the rear base bar.

16. The walker of claim 15, wherein the one or more second side wheels or castors is positioned laterally to the upper bar in the first lateral direction.

17. The walker of claim 13, wherein the rear vertical bar is coupled to the rear base bar using a first extension, wherein the rear vertical bar is also coupled to the upper bar using a second extension, wherein the lower bar is coupled to the rear vertical bar using a third extension, wherein the lower bar is also coupled to the front vertical bar using a fourth extension, and wherein the front wheel structure is coupled to the front vertical bar using a fifth extension.

* * * * *